(12) United States Patent  
Lee et al.

(10) Patent No.: US 8,693,612 B2  
(45) Date of Patent: Apr. 8, 2014

(54) UNIT SPACER GRID STRAP, UNIT SPACER GRID, AND SPACER GRID FOR NUCLEAR FUEL RODS

(75) Inventors: Young Ho Lee, Daejeon (KR); Kang Hee Lee, Daejeon (KR); Jae Yong Kim, Daejeon (KR); Kyung Ho Yoon, Daejeon (KR); Hyung Kyu Kim, Daejeon (KR); Chang Hwan Shin, Daejeon (KR); Dong Seok Oh, Daejeon (KR); Wang Ki In, Daejeon (KR); Tae Hyun Chun, Daejeon (KR); Kun Woo Song, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 1244 days.

(21) Appl. No.: 12/557,939

(22) Filed: Sep. 11, 2009

(65) Prior Publication Data

US 2011/0064184 A1    Mar. 17, 2011

(51) Int. Cl.  
*G21C 3/34* (2006.01)

(52) U.S. Cl.  
USPC ........... 376/441; 376/409; 376/426; 376/434; 376/438; 376/462

(58) Field of Classification Search  
USPC .................................. 376/438, 441, 442, 462  
See application file for complete search history.

(56) References Cited

U.S. PATENT DOCUMENTS

| 4,426,355 A | * | 1/1984 | Burger | 376/442 |
| 4,714,585 A | | 12/1987 | Kast | |
| 2010/0246747 A1 | * | 9/2010 | Gomez et al. | 376/438 |

FOREIGN PATENT DOCUMENTS

| FR | 2923321 A1 * | 5/2009 |
| FR | 29223321 A1 * | 5/2009 |
| JP | 1993-223971 A | 9/1993 |
| JP | 1994-027275 A | 2/1994 |
| JP | 1994-265691 A | 9/1994 |
| JP | 2995536 B2 | 10/1999 |
| KR | 0330358 B1 | 3/2002 |
| KR | 10-2003-0069672 A | 4/2005 |
| KR | 0600983 B1 | 7/2006 |

* cited by examiner

*Primary Examiner* — Jack W Keith  
*Assistant Examiner* — Marshall O'Connor  
(74) *Attorney, Agent, or Firm* — Maier & Maier, PLLC

(57) ABSTRACT

A spacer grid for nuclear fuel rods includes a plurality of unit spacer grids stacked one on top of another. Each unit spacer grid includes a plurality of unit spacer grid straps disposed at regular intervals in a row, and a plurality of fixing grid straps connected to respective opposite ends of the unit spacer grid straps so as to fix the unit spacer grid straps. Each unit spacer grid strap has convexities alternating with each other on opposite sides thereof at regular intervals, and at least one of the convexities has a diameter greater than the others. The unit spacer grids are rotated in one direction by a 90 or 180 degree angle when being stacked.

6 Claims, 16 Drawing Sheets

US 8,693,612 B2

UNIT SPACER GRID STRAP, UNIT SPACER GRID, AND SPACER GRID FOR NUCLEAR FUEL RODS

BACKGROUND OF THE INVENTION

1. Field of the Invention

The present invention relates, in general, to a spacer grid for nuclear fuel rods and, more particularly, to a spacer grid for dual-cooled nuclear fuel rods, capable of supporting the dual-cooled nuclear fuel rods constituting a nuclear fuel assembly used in the core of a light water reactor.

2. Description of the Related Art

A spacer grid for nuclear fuel rods is a principal component of a nuclear fuel assembly used in the core of a light water reactor, and stably positions a plurality of nuclear fuel rods, which constitute the nuclear fuel assembly, up to the end of their viable period under severe conditions in a preset space of the reactor core.

Meanwhile, a coolant flows around the nuclear fuel assembly at high speed. Thus, this coolant may cause the nuclear fuel rods to experience fluid-induced vibration. The spacer grid for nuclear fuel rods functions to inhibit such fluid-induced vibration of the nuclear fuel rods.

FIG. 1 is a schematic front view illustrating a conventional nuclear fuel assembly. FIG. 2 is a schematic top plan cross-sectional view taken along line I-I' of FIG. 1. FIG. 3 is a schematic perspective view illustrating a spacer grid constituting the nuclear fuel assembly of FIG. 1. FIG. 4 is a schematic top plan view illustrating the spacer grid of FIG. 3.

FIG. 5 is a schematic perspective view illustrating a unit spacer grid strap of the spacer grid of FIG. 3.

Referring to FIGS. 1 through 5, the nuclear fuel assembly 10 includes fuel rods 11, an upper end fitting 12, a lower end fitting 13, guide tubes 14, and spacer grids 15. Each fuel rod 11 includes a cylindrical uranium sintered compact (called a cylindrical uranium pellet) in a zirconium alloy cladding tube. The uranium pellet causes a nuclear fission reaction which generates high-temperature heat.

Each guide tube 14 adjusts the output of a reactor core, and is used as a passage for a control rod which moves up and down in order to stop the nuclear fission reaction.

Each spacer grid 15 is usually formed of zircaloy, and includes nuclear fuel rod cells into which the nuclear fuel rods are inserted, and guide tube cells into which the guide tubes are inserted.

Each nuclear fuel rod cell of the spacer grid is configured so that a total of two spacer grid springs 28 and a total of four dimples 29 support the nuclear fuel rod 11 at a total of six supporting points, wherein the two spacer grid springs 28 are located one by one on two respective faces of the nuclear fuel rod cell, and the four dimples 29 are located in pairs on upper and lower sides of each spacer grid spring 28 on the other two faces of the nuclear fuel rod cell.

If the springs 28 and the dimples 29 are too low in elasticity, it is difficult to arrange the nuclear fuel rod 11 at a preset position, so that there is a possibility that supportability of the nuclear fuel rod 11 will become unsound.

In contrast, if the springs 28 and the dimples 29 are too high in elasticity, defects such as scratches may occur on a surface of the nuclear fuel rod 11 as a result of excessive frictional resistance occurring when the nuclear fuel rod 11 is inserted into the nuclear fuel rod cell.

Further, it is impossible to properly cover lengthwise growth of the nuclear fuel rod 11, which is caused by neutron irradiation occurring during operation of the nuclear reactor, so that the nuclear fuel rod 11 becomes bent, i.e. the nuclear fuel rod 11 can exhibit the phenomenon of flexure.

When bent, the nuclear fuel rod 11 approaches or contacts other neighboring nuclear fuel rods 11, so that the coolant channel between the nuclear fuel rods is narrowed or blocked.

Here, the coolant rapidly flows from bottom to top of the reactor core in an axial direction through sub-channels 25, each of which is surrounded by four nuclear fuel rods 11 or by three nuclear fuel rods 11 and one guide tube 14.

In other words, the sub-channel 25 refers to a space that is surrounded by the nuclear fuel rods 11, and particularly to a passage whose circumference has spaces which allow a fluid to freely move to the adjacent fluid channels.

As described above, when the coolant channel is narrowed or blocked, the heat generated from the nuclear fuel rod is not effectively transmitted to the coolant, thereby increasing a temperature of the nuclear fuel rod. As such, the possibility of generating departure from nucleate boiling (DNB) is increased, which is the main cause of a reduction of nuclear fuel output.

The upper end fitting 12 and the lower end fitting 13 function to fix and support the nuclear fuel assembly 10 to and on upper and lower structures of the reactor core. The lower end fitting 13 includes a filter for filtering foreign materials flowing in the reactor core (i.e. a foreign material filter, not shown).

FIG. 6 is a schematic top plan cross-sectional view illustrating a dual-cooled nuclear fuel rod, and FIG. 7 is a schematic top plan view illustrating a nuclear fuel assembly into which the annular nuclear fuel rods of FIG. 6 are inserted.

Referring to FIGS. 6 and 7, the dual-cooled nuclear fuel rod has an annular structure instead of a cylindrical structure, and is disclosed in U.S. Pat. Nos. 3,928,132 and 6,909,765.

The dual-cooled nuclear fuel rod 30 having the annular structure includes an annular pellet 31, an inner cladding tube 32 installed on the inner circumference of the pellet 31, and an outer cladding tube 33 installed on the outer circumference of the pellet 31.

The dual-cooled nuclear fuel rod 30 having this structure allows the coolant to flow in the outside as well as in the inside of the dual-cooled nuclear fuel rod 30, so that double heat transfer can occur so that the center of the dual-cooled nuclear fuel rod 30 can be maintained at a low temperature. In addition, the dual-cooled nuclear fuel rod 30 increases a heat transfer area to allow high burnup and output to be obtained.

As described above, when the center temperature of the dual-cooled nuclear fuel rod 30 is kept low, the possibility of the fuel being damaged as a result of the center temperature of the dual-cooled nuclear fuel rod 30 increasing is lowered, so that the safety margin of the dual-cooled nuclear fuel rod 30 can be increased.

However, in order to be structurally compatible with an existing pressurized light water reactor core, the position of each guide tube 14 cannot be changed in the nuclear fuel assembly 10, and the dual-cooled nuclear fuel rod 30 has an outer diameter greater than that of an existing cylindrical nuclear fuel rod. As such, a gap between the dual-cooled nuclear fuel rods is considerably narrowed compared to that between the cylindrical nuclear fuel rods.

For example, in the case where the nuclear fuel assembly is configured to have the dual-cooled nuclear fuel rods inserted in a 12×12 array, the gap between the dual-cooled nuclear fuel rods is reduced from 3.35 mm, which is the existing gap, to about 1.24 mm.

Thus, due the narrow gap between the dual-cooled nuclear fuel rods, the spacer grids that have been developed up to now cannot be used for the dual-cooled nuclear fuel rods 30 without being changed.

In detail, the thickness, 0.475 mm, of a unit spacer grid strap of the existing spacer grid is subtracted from the gap, 1.24 mm, between the dual-cooled nuclear fuel rods, and than the obtained result is divided into halves again. As a result, the gap between the unit spacer grid strap and the nuclear fuel rod merely amounts to about 0.383 mm.

It is impossible to design the spring having rigidity and hydraulic characteristics (mainly, pressure loss) of the existing spacer grid by applying the shape and supporting point of the existing spring within a gap which is as narrow as this. Further, the channel of the coolant is reduced by this narrow gap, so that a cooling function of the coolant is reduced.

SUMMARY OF THE INVENTION

Accordingly, the present invention has been made keeping in mind the above problems occurring in the related art, and example embodiments of the present invention are directed toward providing a spacer grid for nuclear fuel rods, capable of properly supporting and cooling the nuclear fuel rods in spite of a gap between the nuclear fuel rods which is reduced by an increase in outer diameter of each nuclear fuel rod.

According to an aspect of the present invention, there is provided a unit spacer grid strap. The unit spacer grid strap includes: a plurality of first convexities protruding in one direction so as to be placed in contact with a nuclear fuel rod; a plurality of second convexities alternating with the first convexities, protruding in the other direction so as to be in contact with another nuclear fuel rod; and a plurality of joints, each of which connects the first convexity and the second convexity.

Here, each of the first and second convexities may include: an intermediate support continuously connected with the joint between the first convexity and the second convexity; an upper support spaced apart from the intermediate support, and continuously connected with one of the two neighboring joints; and a lower support spaced apart from the intermediate support, and continuously connected with the other of the two neighboring joints.

Further, the upper support and the lower support may have point symmetry with respect to a middle point of the intermediate support.

The intermediate support, the upper support, and the lower support may have a corrugated shape in a long-axial direction.

Each of the first and second convexities may include a middle face and a pair of inclined faces so as to form a symmetric line with respect to a longitudinal central axis of the middle face, and each inclined face may include at least one sub-convexity protruding in a direction in which each of the first and second convexities protrudes.

The sub-convexities protruding from the pair of inclined faces may be line symmetrical with respect to the middle face.

Each sub-convexity may be continuously connected to the corresponding inclined face only at one end thereof.

At least one of the first and second convexities may have a larger diameter than the others.

According to another aspect of the present invention, there is provided a unit spacer grid. The unit spacer grid includes: a plurality of unit spacer grid straps disposed at regular intervals; and a pair of fixing grid straps connected to respective opposite ends of the unit spacer grid straps so as to fix the unit spacer grid straps.

Here, each fixing grid strap may include a plurality of slits, into each of which the unit spacer grid strap is inserted.

According to another aspect of the present invention, there is provided a spacer grid for nuclear fuel rods. The spacer grid for nuclear fuel rods includes a plurality of unit spacer grids stacked one on top of another. The unit spacer grids may be rotated at a predetermined angle when being stacked.

Here, the predetermined angle may be either a 90 or 180 degree unidirectional rotation made when the unit spacer grids are each being stacked.

The unit spacer grids may be coupled by fixing rods when being stacked.

The fixing rods may be coupled to the respective four corners or middles of four faces of the unit spacer grids.

According to another aspect of the present invention, there is provided a spacer grid for nuclear fuel rods. The spacer grid for nuclear fuel rods includes a plurality of unit spacer grids stacked one on top of another. Each unit spacer grid includes: a plurality of unit spacer grid straps disposed at regular intervals in a row, and a plurality of fixing grid straps connected to respective opposite ends of the unit spacer grid straps so as to fix the unit spacer grid straps. Each unit spacer grid strap may have convexities alternating with each other on opposite sides thereof at regular intervals, and at least one of the convexities may have a diameter greater than the others. The unit spacer grids may be rotated in one direction at an angle of 90 or 180 degrees when being stacked.

Here, each convexity may be partitioned into an intermediate support, an upper support above the intermediate support, and a lower support below the intermediate support, and the upper support may be configured so that one end thereof adjacent to the intermediate support is suspended in a space. The lower support may be configured so that one end thereof adjacent to the intermediate support is suspended in the space, and the upper support and the lower support may have point symmetry with respect to a middle point of the intermediate support.

Each convexity may includes a middle face and inclined faces inclined toward opposite sides of the middle face, and each inclined face may include at least one sub-convexity protruding in a direction in which each convexity protrudes.

The sub-convexity may be at least configured so that one end thereof is suspended in a space.

The stacked unit spacer grids may be coupled by fixing rods inserted into the respective four corners or middles of four faces thereof.

According to the spacer grid for nuclear fuel rods, although a dual-cooled nuclear fuel rod has a greater outer diameter than an existing nuclear fuel rod and thus a gap between the dual-cooled nuclear fuel rods inserted into an existing spacer grid is reduced, the spacer grid for nuclear fuel rods formed by stacking the unit spacer grids is capable of adapting to a change in the vibrational characteristics of the dual-cooled nuclear fuel rod.

Thus, the nuclear fuel rod supports formed on the spacer grid for nuclear fuel rods, i.e. the convexities 110 functioning as conventional spring and dimples, can be not only freely changed in number and shape, but also exclude structures inhibiting the flow of a coolant to produce improved effects form the thermal-hydraulic aspect.

Further, the spacer grid for nuclear fuel rods is formed by stacking the unit spacer grids, so that the strength of the spacer grid for nuclear fuel rods can be improved.

In addition, the spacer grid for nuclear fuel rods may be applied to the spacer grid of a conventional 16×16 nuclear fuel assembly by changing the position and number of the convexities, and be applied to a purpose for supporting a structure contacted with a fluid or an elongated tube in ordinary industries.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Reference will now be made in greater detail to a spacer grid for nuclear fuel rods according to an example embodiment of the invention with reference to the accompanying drawings.

Figure 1:
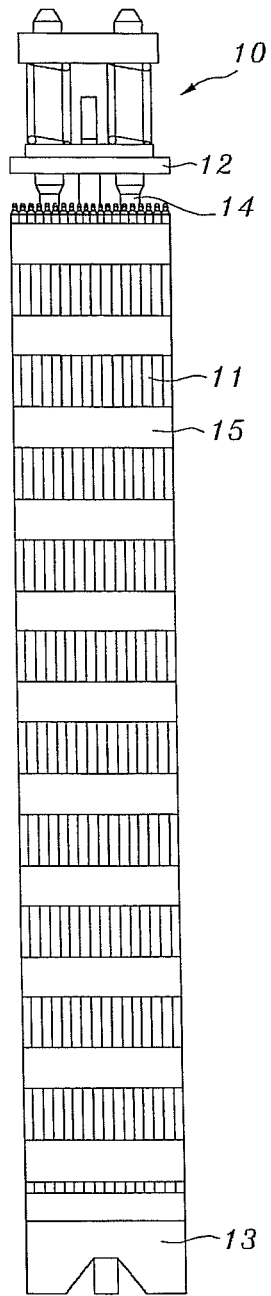
FIG. 1 is a schematic front view illustrating a conventional nuclear fuel assembly.
Figure 2:
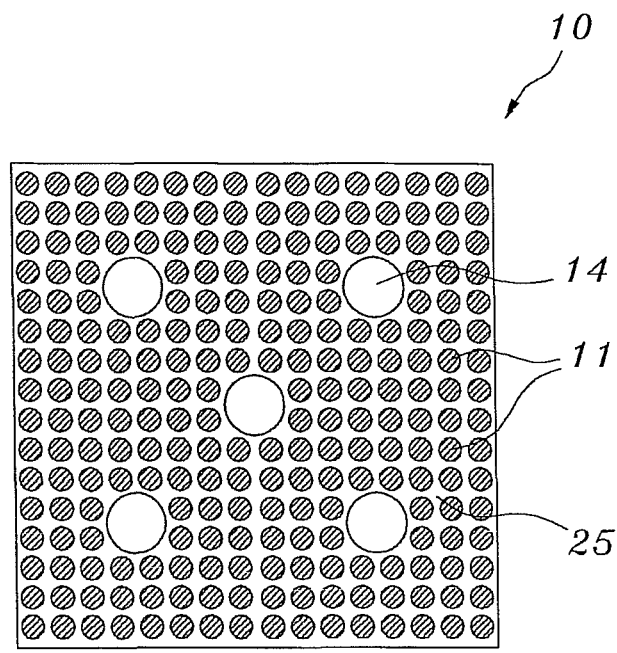
FIG. 2 is a schematic top plan cross-sectional view taken along line I-I' of FIG. 1.
Figure 3:
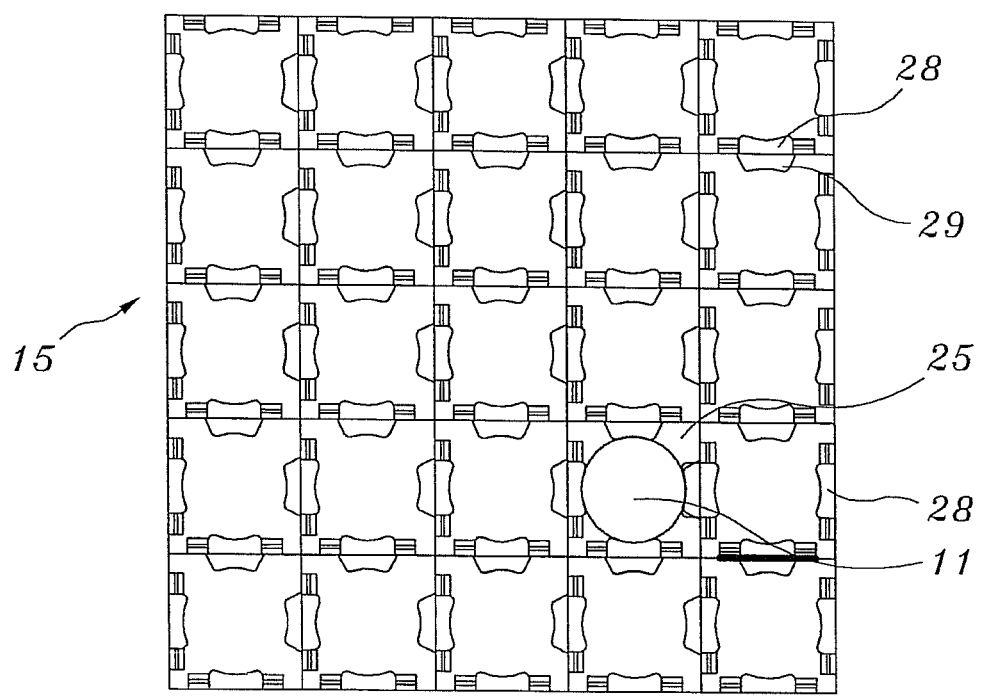
FIG. 3 is a schematic perspective view illustrating a spacer grid constituting the nuclear fuel assembly of FIG. 1.
Figure 4:
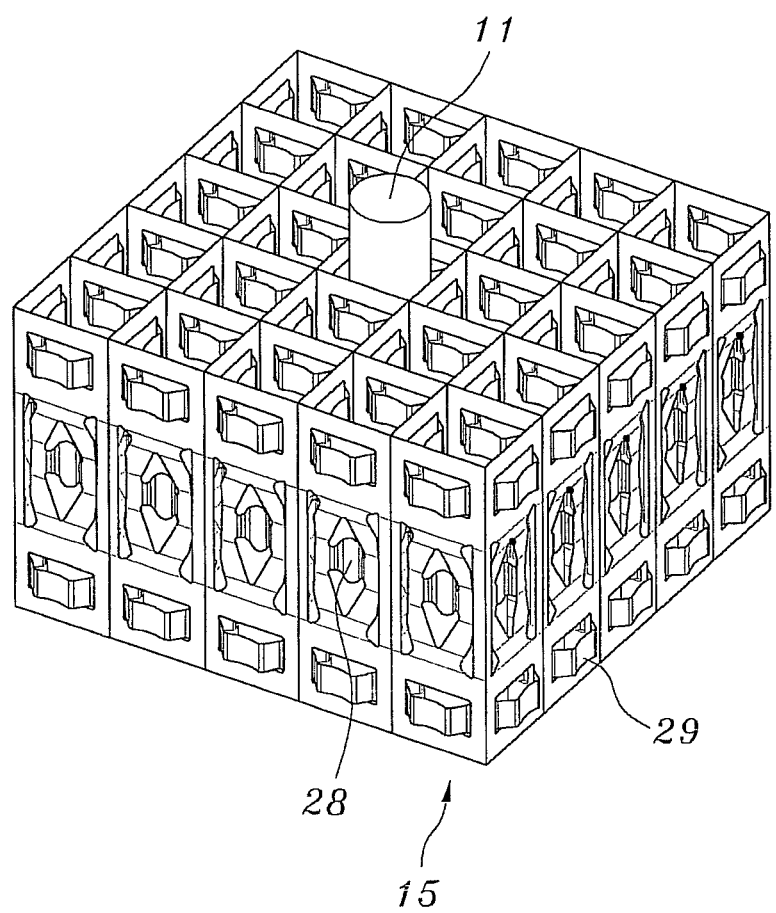
FIG. 4 is a schematic top plan view illustrating the spacer grid of FIG. 3.
Figure 5:
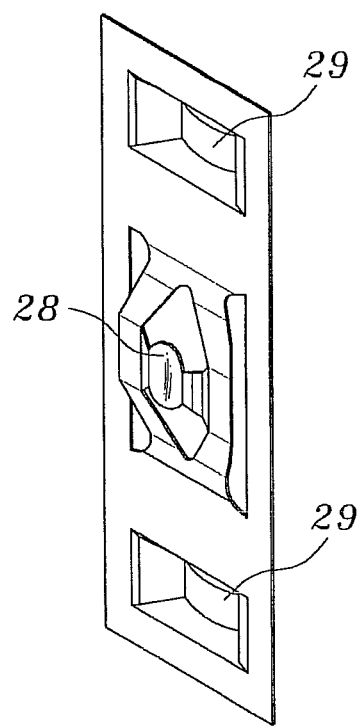
FIG. 5 is a schematic perspective view illustrating a unit spacer grid strap of the spacer grid of FIG. 3.
Figure 6:
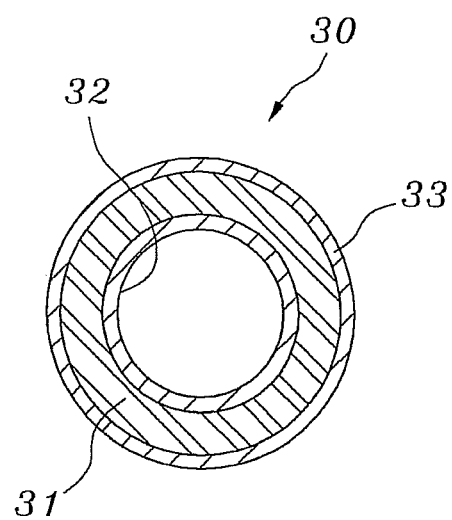
FIG. 6 is a schematic top plan cross-sectional view illustrating a dual-cooled nuclear fuel rod.
Figure 7:
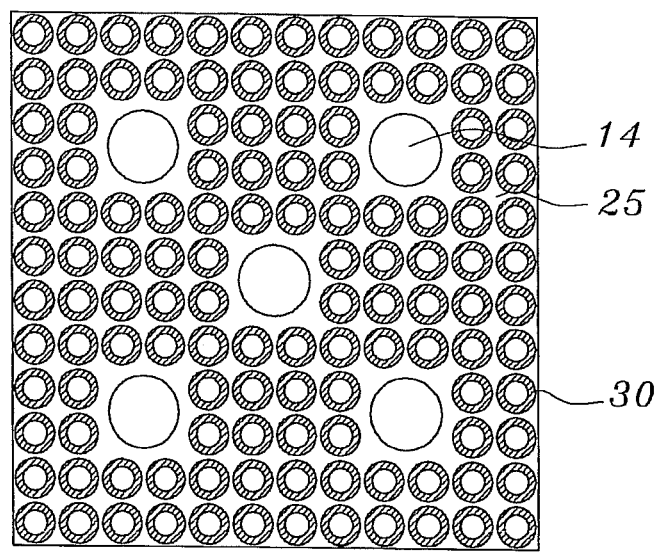
FIG. 7 is a schematic top plan view illustrating a nuclear fuel assembly into which the annular nuclear fuel rods of FIG. 6 are inserted.
Figure 8:
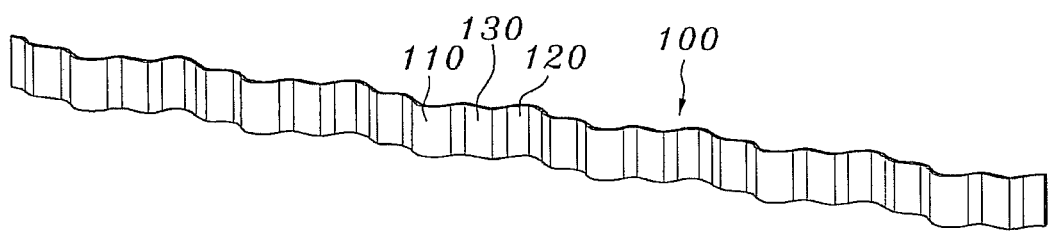
FIG. 8 illustrates a unit spacer grid strap according to an embodiment of the present invention.

FIG. 8 illustrates a unit spacer grid strap according to an embodiment of the present invention.

Referring to FIG. 8, a unit spacer grid strap 100 may be configured so that a short axis thereof is shorter than that of a conventional unit spacer grid strap, and includes a plurality of first convexities 110, a plurality of second convexities 120, and a plurality of joints 130.

The first convexities 110 and the second convexities 120 may alternate with the joints 130. When the first convexities 110 protrude in one direction, the second convexities 120 may protrude in the other direction opposite that in which the first convexities 110 protrude.

The protruding parts of the first and second convexities 110 and 120 may function as springs, and come into contact with and elastically support nuclear fuel rods, particularly dual-cooled nuclear fuel rods.

At least one of the first and second convexities 110 and 120 may be formed so as to have a greater diameter than the others in order to insert a guide tube or a measurement tube.

The convexities described below conceptually include the first and second convexities 110 and 120. The following description will be made taking the first convexities 110 by way of example.

Figure 9:
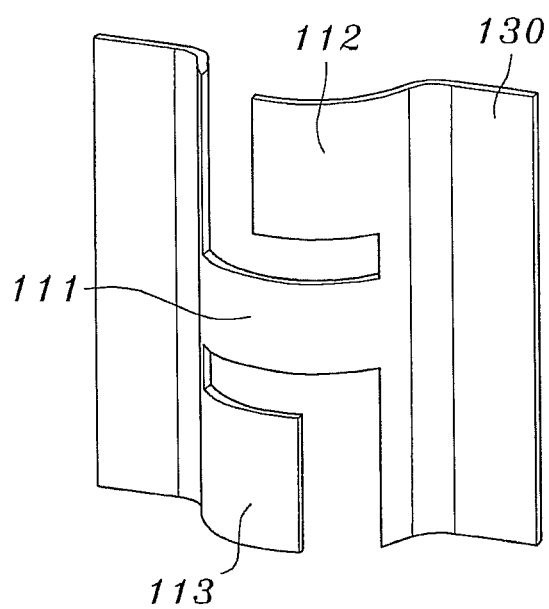
FIG. 9 illustrates a first embodiment of a convexity in the unit spacer grid strap of FIG. 8.

FIG. 9 illustrates a first embodiment of a convexity in the unit spacer grid strap of FIG. 8.

Referring to FIG. 9, the convexity 110 may includes an intermediate support 111, an upper support 112, and a lower support 113.

The intermediate support 111 may be formed in the middle of the convexity 110, and opposite ends thereof may be continuously connected to the joints 130 on opposite sides of the convexity 110.

The upper support 112 may be formed above the intermediate support 111, and only one end thereof may be continuously connected to the joint 130 on one side of the convexity 110.

In detail, the upper support 112 has a shorter horizontal length than the intermediate support 111, so that the other end thereof can be suspended in a space between the joint 130 and the neighboring joint 130 without being connected between the joint 130 and the neighboring joint 130 unlike the intermediate support 111.

The lower support 113 may be formed above the intermediate support 111, and only one end thereof may be continuously connected to the joint 130 on the other side of the convexity 110.

In detail, the upper support 112 may be connected to the joint 130 on one side of the convexity 110, and the lower support 113 may be connected to the joint 130 on the other side of the convexity 110.

Like the upper support 112, the lower support 113 also has a shorter horizontal length than the intermediate support 111, so that the other end thereof can be suspended in the space between the joint 130 and the neighboring joint 130 without being connected between the joint 130 and the neighboring joint 130 unlike the intermediate support 111.

The intermediate support 111, the upper support 112, and the lower support 113 may be formed by cutting out the upper and lower portions of the convexity 110 in L and reverse L shapes.

The upper support 112 and the lower support 113 have point symmetry with respect to the middle point of the intermediate support 111.

In this structure, the convexity 110, particularly the intermediate support 111, the upper support 112, and the lower support 113 come into surface or line contact with the nuclear fuel rod in a narrow space between the nuclear fuel rods, thereby making it possible to sufficiently adapt to a change in the vibrational characteristics of the nuclear fuel rod.

In particular, the upper support 112 and the lower support 113 are partially suspended in the space, so that the force used to elastically support the nuclear fuel rod can be increased.

Figure 10:
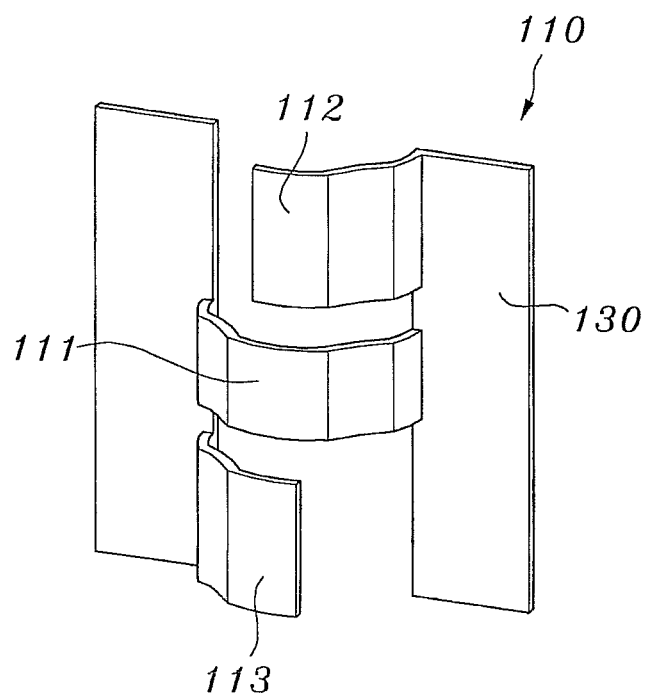
FIG. 10 illustrates a modification of the convexity of FIG. 9.

FIG. 10 illustrates a modification made to the convexity of FIG. 9.

Referring to FIG. 10, the convexity 110, particularly the intermediate support 111, the upper support 112, and the lower support 113 may have a corrugated shape in which crests and troughs of waves alternate with each other in a longitudinal (axial) direction (or in a horizontal direction).

In particular, in the intermediate support 111, the upper support 112, and the lower support 113, portions that are in contact with the nuclear fuel rod may have a shape of the trough of a wave so as to surround the outer circumference of the nuclear fuel rod.

When the convexity 110 is formed in the corrugated shape described above, the convexity 110 can increase the elastic supporting force used to elastically support the nuclear fuel rod.

Figure 11:
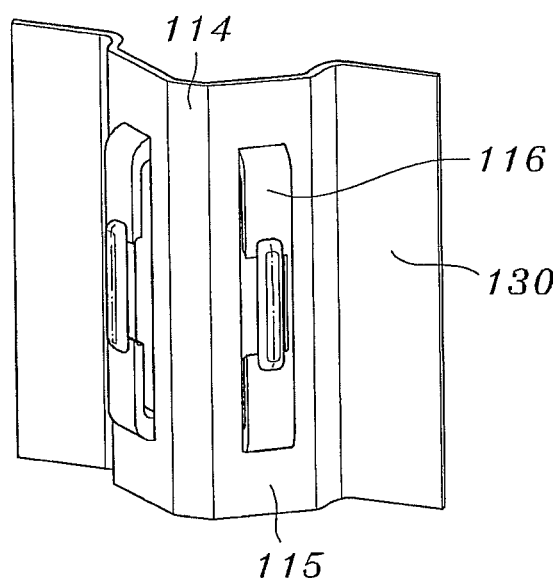
FIG. 11 illustrates a second embodiment of a convexity in the unit spacer grid strap of FIG. 8.
Figure 12:
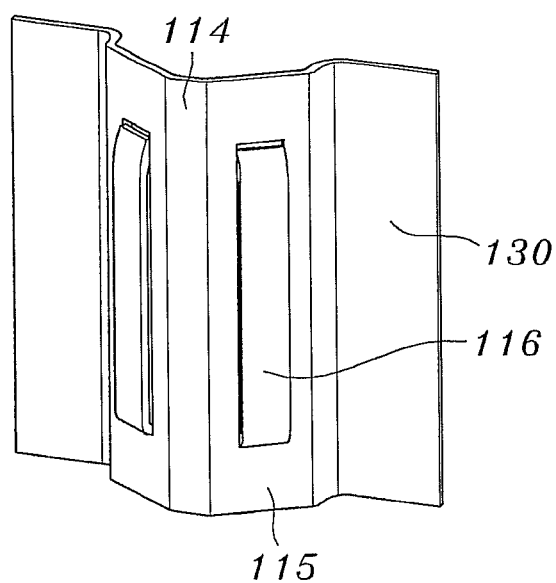
FIGS. 12 and 13 illustrate a modification of the convexity of FIG. 11.
Figure 13:
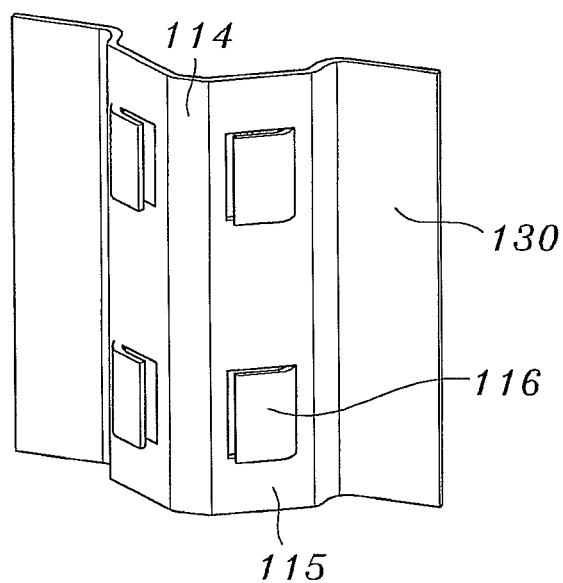

FIGS. 11, 12 and 13 illustrate a second embodiment of a convexity in the unit spacer grid strap of FIG. 8. Referring to FIG. 11, the convexity 110 may include a middle face 114 and a pair of inclined faces 115 so as to be line symmetrical with respect to a longitudinal central axis of the middle face 114.

Each inclined face 115 is provided with a sub-convexity 116, which may protrude in a direction in which the convexity 110 protrudes.

The sub-convexity 116 may be obtained by forming a pair of parallel slits in each inclined face 115, and then protruding a portion between the slits using mechanical working such as drawing.

Referring to FIG. 12, the sub-convexity 116 is cut out at an upper or lower end thereof, so that only one end thereof can be connected to the inclined face 115, and the other end thereof can be suspended in a space.

Referring to FIG. 13, each inclined face 115 may be provided with a plurality of sub-convexities 116. Here, one end of each sub-convexity may be cut out on the side of the middle face 114 so as to be suspended in a space, and only the other end of each sub-convexity may be connected to the inclined face 115.

With this structure, the convexity 110, particularly one or more sub-convexities 116 of each inclined face 115, comes into surface or line contact with the nuclear fuel rod in the narrow space between the nuclear fuel rods, thereby making it possible to sufficiently adapt to a change in the vibrational characteristics of the nuclear fuel rod.

In particular, each sub-convexity 116 is partially suspended in the space, so that the force elastically supporting the nuclear fuel rod can be increased.

Figure 14:
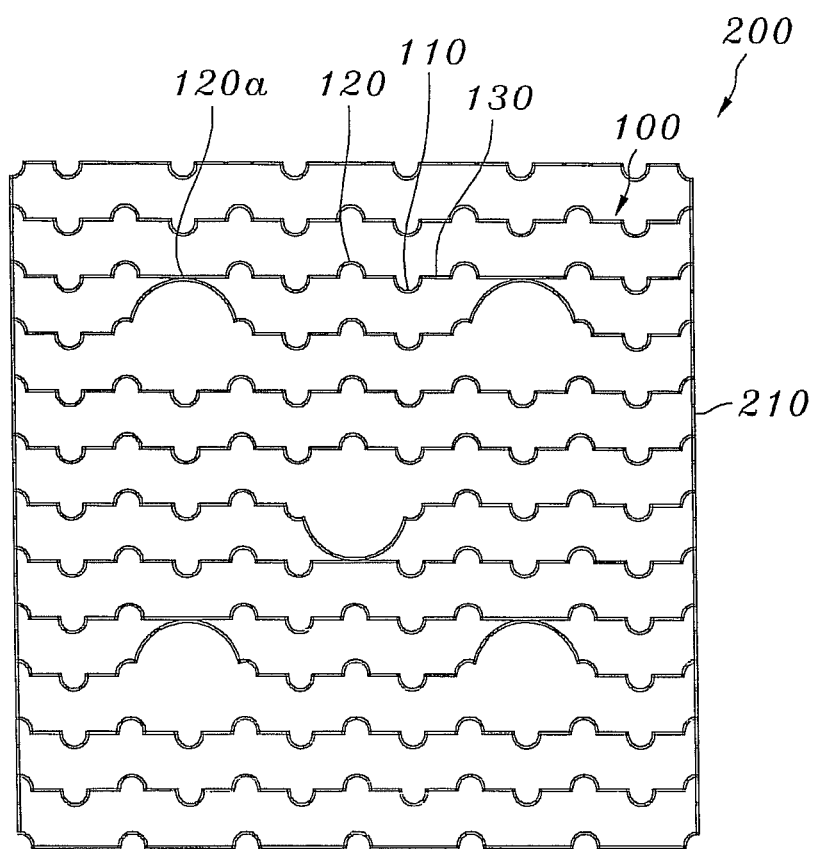
FIG. 14 is a schematic top plan view illustrating a unit spacer grid according to an embodiment of the present invention.

FIG. 14 is a top plan view illustrating a unit spacer grid formed by the unit spacer grid straps of FIG. 8.

Referring to FIG. 14, the unit spacer grid 200 may be formed by disposing a plurality of unit spacer grid straps 100 at regular intervals, and connecting a pair of fixing grid straps 210 to respective opposite ends of the unit spacer grid straps 100.

Each fixing grid strap 210 may be provided with a plurality of slits (not shown), into which first ends of the unit spacer grid straps 100 may be inserted respectively.

In order to reinforce the connection between the unit spacer grid straps 100 and the fixing grid straps 210, the connected portions may be welded.

Meanwhile, among the unit spacer grid straps 100 arranged in a row, the two disposed on the outermost sides may have the convexities protruding only in an inward direction.

In detail, the unit spacer grid straps 100 are configured so that the first and second convexities 110 and 120 alternately protrude so as to be opposed to each other in the opposite direction. Here, the two unit spacer grid straps 100 disposed on the outermost sides are configured so that only one of the first and second convexities 110 and 120, i.e. only the convexities protruding only in the inward direction, face the neighboring unit spacer grid strap 100.

Figure 15:
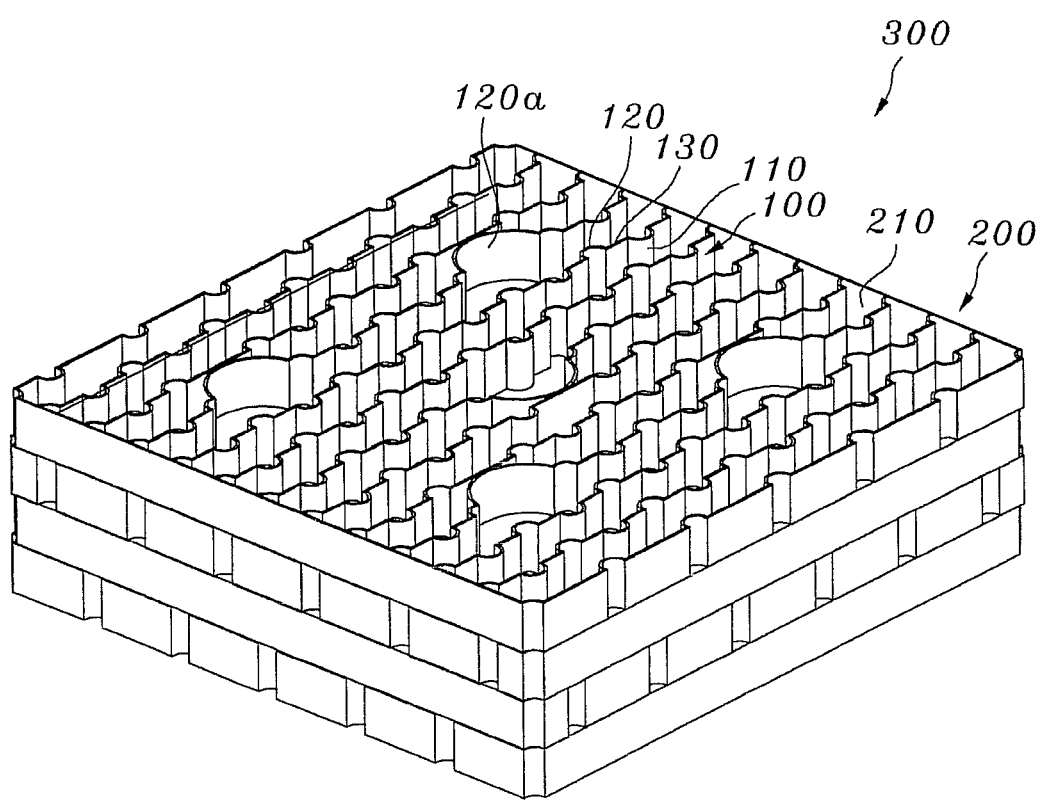
FIG. 15 is a schematic perspective view illustrating a spacer grid for nuclear fuel rods according to an embodiment of the present invention.
Figure 16:
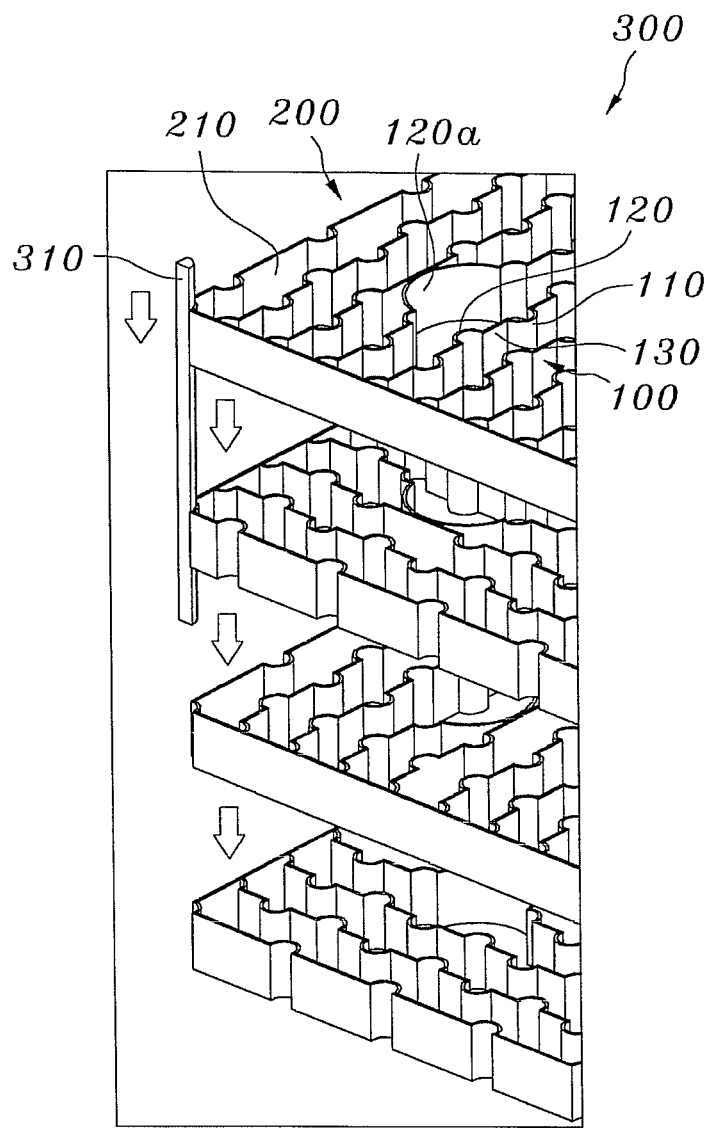
FIG. 16 is a schematic perspective view illustrating how fixing rods are coupled to the spacer grid for nuclear fuel rods illustrated in FIG. 15.

FIGS. 15 and 16 are perspective views illustrating a spacer grid for nuclear fuel rods in which the unit spacer grids of FIG. 14 are stacked.

Referring to FIGS. 15 and 16, the spacer grid 300 for nuclear fuel rods may be formed by stacking a plurality of unit spacer grids 200.

When stacked, the unit spacer grids 200 may be rotated relative to each other by a predetermined angle.

More specifically, when stacked, the unit spacer grids 200 may be rotated relative to each other by an angle of 90 or 180 degrees.

In the case where the unit spacer grids 200 are rotated by every 90 degrees when stacked, each nuclear fuel rod may be elastically supported at four points by the convexities 110. In the case where the unit spacer grids 200 are rotated by 180 degrees when stacked, each nuclear fuel rod may be elastically supported at two points by the convexities 110.

The stacked unit spacer grids 200 may reinforce the stacked connection by coupling fixing rods 310 to the respective four corners or middles of four faces.

Although a dual-cooled nuclear fuel rod has a greater outer diameter than an existing nuclear fuel rod and thus a gap between the dual-cooled nuclear fuel rods inserted into an existing spacer grid is reduced, the spacer grid 300 for nuclear fuel rods having the aforementioned structure formed by stacking the unit spacer grids 200 is capable of adapting to a change in the vibrational characteristics of the dual-cooled nuclear fuel rod.

Thus, the nuclear fuel rod supports formed on the spacer grid 300 for nuclear fuel rods, i.e. the convexities 110 functioning as conventional spring and dimples, can be not only freely changed in number and shape, but also exclude a structure which would inhibit the flow of a coolant to produce improved effects from the thermal-hydraulic aspect.

Further, the spacer grid 300 for nuclear fuel rods is formed by stacking the unit spacer grids 200, so that the strength of the spacer grid 300 for nuclear fuel rods can be improved upon.

Meanwhile, the spacer grid 300 for nuclear fuel rods may be applied to the spacer grid of a conventional 16×16 nuclear fuel assembly by changing position and number of the convexities, and be applied for the purpose of supporting a structure contacted with a fluid or an elongated tube in non-nuclear industries.

Although example embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A unit spacer grid strap comprising:
a plurality of first convexities protruding in one direction so as to be placed in contact with a nuclear fuel rod;
a plurality of second convexities alternating with the first convexities, protruding in the other direction so as to be in contact with another nuclear fuel rod; and
a plurality of joints, each of which connects the first convexity and the second convexity,
wherein each of the first and second convexities includes:
an intermediate support continuously connected with the joint between the first convexity and the second convexity;
an upper support on a top edge of the unit spacer grip strap spaced apart from the intermediate support, and continuously connected with one of the two neighboring joints, the upper support having a shorter length than the intermediate support so that an end of the upper support is suspended in the space between the two neighboring joints; and a lower support on a bottom edge of the unit spacer grid strap spaced apart from the intermediate support, and continuously connected with the other of the two neighboring joints, the lower support having a shorter length than the intermediate support so that an end of the lower support is suspended in the space between the two neighboring joints.

2. The unit spacer grid strap as set forth in claim 1, wherein the upper support and the lower support have point symmetry with respect to a middle point of the intermediate support.

3. The unit spacer grid strap as set forth in claim 1, wherein at least one of the first and second convexities has a greater diameter than the others.

4. A spacer grid for nuclear fuel rods comprising:
a plurality of unit spacer grids in a stacked configuration, each unit spacer grid including:
a plurality of unit spacer grid straps disposed in a row at regular intervals, each having convexities alternating with each convexity on opposite sides of each strap at regular intervals, at least one of the convexities having a diameter greater than the others; and
a plurality of fixing grid straps connected to respective opposite ends of the unit spacer grid straps so as to fix the unit spacer grid straps,
each convexity is partitioned into an intermediate support, an upper support on a top edge of the unit spacer grid strap above the intermediate support, and a lower support on a lower edge of the unit spacer grid strap below the intermediate support;
the upper support is configured so that one end thereof adjacent to the intermediate support is suspended in a space;
the lower support is configured so that one end thereof adjacent to the intermediate support is suspended in the space,
wherein the unit spacer grids are rotated in one direction at an angle of 90 or 180 degrees with respect to adjacent unit spacer grids in the stacked configuration.

5. The spacer grid for nuclear fuel rods as set forth in claim 4, wherein:
the upper support and the lower support have point symmetry with respect to a middle point of the intermediate support.

6. The spacer grid for nuclear fuel rods as set forth in claim 4, wherein the stacked unit spacer grids are coupled by fixing rods inserted into respective four corners or middles of four faces thereof.

* * * * *